3,340,260
4-AMINO-PYRIMIDINES
Herbert Morton Blatter, Summit, N.J., assignor to Ciba Corporation, New York, N.Y., a corporation of Delaware
No Drawing. Filed Nov. 3, 1966, Ser. No. 591,700
9 Claims. (Cl. 260—247.1)

This is a continuation-in-part of application Ser. No. 310,152, filed Sept. 19, 1963, which in turn is a continuation-in-part of application Ser. No. 241,474, filed Dec. 3, 1962, both now abandoned.

The present invention concerns 2-aryl-4-N-(2-tertiary amino-lower alkyl)-N-R-amino-quinazoline compounds, in which lower alkyl separates tertiary amino from amino by two carbon atoms, and R is hydrogen or an organic radical, or salts thereof, as well as N-oxides thereof, salts of N-oxides thereof, or quaternary ammonium compounds thereof. More especially, it relates to compounds of the formula

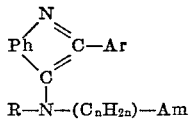

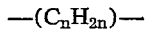

in which Ph is a 1,2-phenylene radical, Ar is a carbocyclic aryl radical or a heterocyclic aryl radical, R is hydrogen or an organic radical, the group of the formula —($C_nH_{2n}$)— is lower alkylene separating the group Am from the nitrogen atom in 4-position by two carbon atoms, and Am is an N,N-disubstituted amino group, or the salts thereof, as well as N-oxides thereof, salts of N-oxides thereof, or quaternary ammonium compounds thereof. Also included within the scope of the present invention is a process for the preparation of these compounds.

The 1,2-phenylene radical Ph, representing the hexacyclic carbocyclic aryl portion of the quinazoline nucleus, is unsubstituted or may be substituted by one or more than one of the same or of different substituents attached to any of the four positions available for substitution. Substituents are, for example, lower alkyl, e.g. methyl, ethyl, n-propyl, isopropyl and the like, hydroxyl, etherified hydroxyl, particularly lower alkoxy, e.g. methoxy, ethoxy, n-propyloxy, isopropyloxy, n-butyloxy and the like, as well as lower alkenyloxy, e.g. allyloxy and the like, lower alkylenedioxy, e.g. methylenedioxy and the like, esterified hydroxyl, especially halogeno (representing hydroxyl esterified by a hydrohalic acid), e.g. fluoro, chloro, bromo and the like, halogeno-lower alkyl, e.g. trifluoromethyl and the like, or any other suitable substituent. The 1,2-phenylene group Ph in the above formula is primarily 1,2-phenylene, as well as (lower alkyl)-1,2-phenylene, (hydroxy)-1,2-phenylene, (etherified hydroxy)-1,2-phenylene, such as (lower alkoxy)-1,2-phenylene and the like, (esterified hydroxy)-1,2-phenylene, such as (halogeno)-1,2-phenylene and the like, (halogeno-lower alkyl)-1,2-phenylene, such as (trifluoromethyl)-1,2-phenylene, or any other suitably substituted 1,2-phenylene group.

The aryl group substituting the 2-position and represented in the above formula by the group Ar, is a monocyclic carbocyclic aryl radical, e.g. phenyl or substituted phenyl, in which one or more than one of the same or of different groups may substitute any of the positions available for substitution; substituted phenyl groups are, for example, (lower alkyl)-phenyl, in which lower alkyl is, for example, methyl, ethyl, n-propyl, isopropyl, n-butyl and the like, (esterified hydroxy)-phenyl, such as (lower-alkoxy)-phenyl, in which lower alkoxy is, for example, methoxy, ethoxy, n-propyloxy, isopropyloxy and the like, (esterified hydroxy)-phenyl, such as (halogeno)-phenyl, in which halogeno stands for fluoro, chloro, bromo and the like, (halogeno-lower alkyl)-phenyl, such as (trifluoromethyl)-phenyl, or any other suitably substituted phenyl radical. It may also represent a bicyclic carbocyclic aryl radical, i.e. naphthyl, e.g. 1-naphthyl or 2-naphthyl, or substituted naphthyl, in which one or more than one of the same or of different substituents may be attached to any of the positions available for substitution; substituents are, for example, lower alkyl, etherified hydroxy, e.g. lower alkoxy and the like, esterified hydroxy, e.g. halogeno and the like, halogeno-lower alkyl, e.g. trifluoromethyl and the like. The aryl group, represented by Ar in the above formula, may also be a heterocyclic aryl group, such as monocyclic azacyclic aryl, particularly pyridyl, e.g. 2-pyridyl, 3-pyridyl or 4-pyridyl, as well as monocyclic thiacyclic aryl, particularly thienyl, e.g. 2-thienyl and the like, or monocyclic oxacyclic aryl, such as furyl, e.g. 2-furyl and the like, or any other suitable aryl radical.

The group R substituting the nitrogen atom of the amino group attached to the 4-position of the quinazoline ring is primarily hydrogen, but may also stand for an organic radical, for example, an aliphatic radical, especially lower alkyl, e.g. methyl, ethyl, n-propyl, isopropyl and the like, as well as a cycloaliphatic radical, such as cycloalkyl, having from three to seven, preferably from five to six, carbon atoms, e.g. cyclopentyl, cyclohexyl, cycloheptyl and the like, cycloalkyl-lower alkyl in which cycloalkyl has from three to seven, preferably from five to six carbon atoms, e.g. cyclopentylmethyl, 2-cyclopentylethyl, cyclohexylmethyl, 1-cyclohexylethyl and the like, or a carbocyclic aryl-aliphatic radical, such as phenyl-lower alkyl, e.g. benzyl, 1-phenylethyl, 2-phenylethyl and the like. The group R may also be an acyl group, especially lower alkanoyl, e.g. acetyl, propionyl and the like.

The lower alkylene portion, separating the tertiary amino group from the amino group attached to the 4-position of the quinazoline nucleus by two carbon atoms and represented in the above formula by the group of the formula —($C_nH_{2n}$)—, contains preferably from two to seven, especially from two to three, carbon atoms. Such alkylene group is preferably 1,2-ethylene, 1,2-propylene, 1,2- or 2,3-butylene, 1,2- or 2,3-pentylene, 1,2- 2,3- or 3,4-hexylene or 3,4-heptylene and the like.

In an N,N-disubstituted amino group Am representing tertiary amino, each of the substituents is, for example, an aliphatic radical, such as lower alkyl, lower alkenyl and the like, a cycloaliphatic radical, such as cycloalkyl and the like, a cycloaliphatic-aliphatic radical, such as cycloalkyl-lower alkyl and the like, a carbocyclic aryl radical, such as monocyclic carbocyclic aryl and the like, or a carbocyclic aryl-aliphatic radical, such as monocyclic carbocyclic aryl-lower alkyl and the like, these radicals have preferably from one to ten carbon atoms. Preferred substituents are lower alkyl, e.g. methyl, ethyl, n-propyl, isopropyl, n-butyl, isobutyl, secondary butyl, n-pentyl, neopentyl and the like; other substituents are lower alkenyl, e.g. allyl, 2-methylallyl and the like, cycloalkyl having from three to seven, preferably from five to six, ring carbon atoms, e.g. cyclopentyl, cyclohexyl and the like, cycloalkyl-lower alkyl, in which cycloalkyl has from three to seven, preferably from five to six, ring carbon atoms, e.g. cyclopentylmethyl, 2-cyclohexylethyl and the like, monocyclic carbocyclic aryl, e.g. phenyl and the like, monocyclic carbocyclic aryl-lower alkyl, such as phenyl-lower alkyl, e.g. benzyl, 1-phenylethyl, 2-phenylethyl and the like. N,N-disubstituted amino groups are primarily N,N - di-lower alkylamino, e.g. N,N - dimethylamino, N-methyl - N - ethylamino, N,N-diethylamino, N,N-di-n- propylamino, N,N-di-isopropylamino and the like, as well as N-cycloalkyl-N-lower alkyl-amino, in which cycloalkyl has from five to six ring carbon atoms, e.g. N-cyclopentyl-N-methyl-amino, N - cyclohexyl - N - methyl-amino, N-cyclohexyl - N - ethyl-amino and the like, or N-lower alkyl - N - phenyl-lower alkyl-amino, e.g. N-benzyl-N-methyl-amino, N - benzyl - N - ethyl-amino, N-ethyl-N-(1 - phenylethyl) - amino, N-methyl - N - (2-phenyl-ethyl)-amino and the like, or any other equivalent N,N-di-substituted amino group. The above substituents particularly lower alkyl, may also carry functional groups, such as hydroxyl, lower alkoxy, e.g. methoxy, ethoxy and the like, lower alkyl-mercapto, e.g. methylmercapto, ethylmercapto and the like, or any other suitable functional group. N,N-disubstituted-amino groups, in which the substituents carry functional groups, are, for example, N-hydroxy-lower alkyl-N-lower alkyl-amino, e.g. N-(2-hydroxyethyl) - N - methyl-amino and the like, N,N-di-hydroxy-lower alkyl-amino, e.g. N,N-di-(2-hydroxyethyl) amino and the like.

The tertiary amino group, such as the N,N - disubstituted amino group Am in the above formula, may also represent 1-N,N - alkylene-imino, in which alkylene has from four to eight carbon atoms, 1-N,N - azaalkylene-imino in which alkylene has from four to six carbon atoms, and the azanitrogen is separated from the imino-nitrogen by at least two carbon atoms, or 1-N,N - oxaalkylene-imino and 1-N,N - thiaalkylene-imino, in which alkylene has preferably four carbon atoms, and the oxa-oxygen and the thia-sulfur, respectively, is separated from the imino-nitrogen by at least two carbon atoms. Together with the nitrogen atom, these alkylene, azaalkylene, oxaalkylene or thiaalkylene radicals represent 1-N,N - alkylene-imino, in which alkylene has from four to eight carbon atoms, e.g. 1-pyrrolidino, 2 - methyl-1-pyrrolidino, 1-piperidino, 2 - methyl - 1 - piperidino, 4-methyl - 1 - piperidino, 1-N,N - (1,6 - hexylene)-imino, 1-N,N - (1,7 - heptylene)-imino and the like, 1-N,N-(azaalkylene)-imino, particularly 1 - N,N - (N-lower alkyl-azaalkylene)-imino, in which alkylene has from four to six carbon atoms and the aza-nitrogen is separated from the imino-nitrogen by at least two carbon atoms, especially 4-lower alkyl-1-piperazino, e.g. 4-methyl-1-piperazino, 4-ethyl-1-piperazino and the like, as well as 1-piperazino, 1-N,N - (3 - aza-1,6-hexylene)-imino, 1-N,N - (3-aza-3-lower alkyl - 1,6 - hexylene)-imino, e.g. 1-N,N-(3-aza-3-methyl - 1,6 - hexylene)-imino and the like, 1-N,N-(4 - aza - 1,7 - heptylene)-imino, 1-N,N-(4-aza-4-lower alkyl-1,7 - heptylene)-imino, e.g. 1-N,N - (4 - aza-4-methyl - 1,7 - heptylene)-imino and the like, 1-N,N-(oxaalkylene)-imino in which alkylene has from four to six carbon atoms and the oxa-oxygen is separated from the imino-nitrogen by at least two carbon atoms, especially 1-N,N - (3-oxaalkylene)-imino, in which alkylene has preferably four carbon atoms, e.g. 4 - morpholino, 3-methyl - 4 - morpholino and the like, or 1-N,N-(thiaalkylene)-imino, in which alkylene has from four to six carbon atoms and the thiasulfur is separated from the imino-nitrogen by at least two carbon atoms, especially 1-N,N - (3 - thiaalkylene)-imino, in which alkylene has preferably four carbon atoms, e.g. 4-thiamorpholino and the like.

Salts of the compounds of this invention are acid addition salts, such as pharmaceutically acceptable, non-toxic acid addition salts, with inorganic acids, e.g. hydrochloric, hydrobromic, sulfuric, phosphoric acids and the like, or organic acids, such as organic carboxylic acids, e.g. acetic, propionic, pivalic, glycolic, lactic, malonic, succinic, maleic, hydroxy-maleic, malic, tartaric, citric, benzoic, salicylic, 2 - acetoxybenzoic, nicotinic, isonicotinic acid and the like, or organic sulfonic acids, e.g. methane sulfonic, ethane sulfonic, ethane 1,2-disulfonic, 2-hydroxyethane sulfonic, p-toluene sulfonic, naphthalene 2-sulfonic acid and the like, or any other suitable acid. Other acid addition salts may be useful as intermediates in the preparation of pharmaceutically acceptable, non-toxic acid addition salts or in the purification of the free compounds, as well as for identification or characterization purposes. Salts, which are prepared primarily for identification purposes, are, for example, those with acidic organic nitro compounds, e.g. picric, picrolonic, flavianic acid and the like, or metal complex acids, e.g. phosphotungstic, phosphomolybdic, chloroplatinic, Reinecke acid and the like. Mono- or poly-salts may be formed depending on the conditions of the salt-forming procedure and the number of salt-forming groups.

Also included within the scope of the present invention are the N-oxides of the aforementioned compounds, as well as the acid addition salts of such N-oxides, for example, the pharmaceutically acceptable, non-toxic acid addition salts of N-oxides, such as those with the above-mentioned acids.

Quaternary ammonium compounds of the compounds of this invention are those formed wth reactive esters from alcohols and strong inorganic or organic acids, particularly those with lower aliphatic hydrocarbon halides, sulfates or sulfonates, such as lower alkyl halides, e.g., methyl, ethyl, n-propyl or isopropyl chloride, bromide, iodide and the like, di-lower alkyl sulfates, e.g., dimethyl sulfate, diethyl sulfate and the like, lower alkyl lower alkane sulfonates, e.g., ethyl or methyl methane or ethane sulfonate and the like, or lower alkyl lower hydroxy-alkane sulfonates, e.g., methyl 2-hydroxy-ethane sulfonate and the like, or lower alkyl monocyclic carbocyclic aryl sulfonates, e.g., methyl p-toluene sulfonate, ethyl p-toluene sulfonate and the like, as well as those with carbocyclic aryl-aliphatic halides, such as phenyl-lower alkyl halides, e.g., benzyl, 1-phenylethyl or 2-phenyl-ethyl chloride, bromide or iodide and the like. Also included as quaternary ammonium compounds are the corresponding quaternary ammonium hydroxides, and the quaternary ammonium salts with other acids, particularly those with the organic carboxylic acids mentioned hereinabove.

The compounds of this invention exhibit valuable pharmacological properties, for example, analgesic effects. This can be demonstrated in animal test using, for example, mammals, particularly mice, as test objects. They are, therefore, useful analgesic agents in the alleviation of acute or chronic pains in mammals.

Particularly outstanding analgesic effects are exhibited by the compounds of the formula

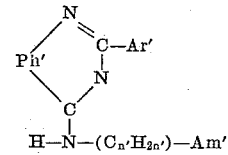

alkyl)-phenyl, (halogeno)-phenyl, pyridyl or thienyl, in which radicals lower alkyl has preferably from one to in which Ph' is 1,2-phenylene, (lower alkyl)-1,2-phenylene or (halogeno)-1,2-phenylene, Ar' is phenyl, (lower four carbon atoms and halogeno has preferably an atomic weight from 19 to 80 inclusive, the group of the formula $-(C_{n'}H_{2n'})-$ is lower alkylene having from two to three carbon atoms (i.e., the letter $n'$ is an integer from two to three) and separating the group Am' from the nitrogen atoms by two carbon atoms, and the group Am' is N,N-di-lower alkyl-amino, pyrrolidino, piperidino, 4-lower alkyl-piperazino, 4-morpholino or 4-thiamorpholino, or acid addition salts, particularly pharmaceutically acceptable, non-toxic acid addition salts, thereof, which when given to mice at subcutaneous doses between about 10 and 200 mg./kg., preferably about 20 and 100 mg./kg., show outstanding analgesic effects.

The compounds of this invention may be used in the form of compositions for enteral, e.g., oral, or parenteral use, which contain the new compounds in admixture with a suitable pharmaceutical organic or inorganic, solid or liquid carrier. For making up these preparations, there can be employed carriers which do not react with the new compounds, such as water, gelatine, lactose, starches, stearic acid, magnesium stearate, calcium stearate, sodium lauryl sulfate, talc, tragacanth, vegetable oils, alcohol, benzyl alcohol, gums, propylene glycol, polyalkylene glycols, or any other carrier material used for pharmaceutical preparations. The latter may be in solid form, for example, as capsules, tablets, dragees and the like, or in liquid form, for example, as solutions, suspensions and the like. If necessary, these preparations may contain auxiliary substances, such as preserving, stabilizing, wetting, emulsifying, coloring, flavoring agents and the like, salts for varying the osmotic pressure, buffers, etc., and may also contain, in combination, other useful substances.

The compounds of this invention are prepared according to known methods, for example, by converting in a 2-aryl-4-2-quinazoline compound, particularly in a compound of the formula

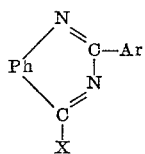

in which Ph and Ar have the previously-given meaning, and X is a group capable of being converted into an N-(tertiary amino-lower alkyl)-N-R-amino group, in which lower alkyl separates tertiary amino from amino in 4-position by 2 carbon atoms, and R has the previously-given meaning, particularly into a group of the formula

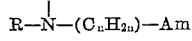

in which Am and the group of the formula —(C$_n$H$_{2n}$)— have the previously-given meaning, or a tautomer thereof, or a salt of such compounds, the group X into the N-(tertiary amino-lower alkyl)-N-R-amino group, in which lower alkyl separates tertiary amino from amino in 4-position by 2 carbon atoms, and R has the previously-given meaning, particularly into the group of the formula

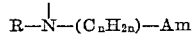

in which Am and the group of the formula —(C$_n$H$_{2n}$)— have the previously-given meaning, and, if desired, converting a resulting salt into the free compound or into another salt, and/or, if desired, converting in a resulting compound a group R into another group R, and/or, if desired, converting a resulting compound into an N-oxide or into a quaternary ammonium compound, and/or, if desired, converting a resulting compound or an N-oxide thereof into a salt thereof, and/or, if desired, converting a resulting quaternary ammonium compound into another quaternary ammonium compound, and/or, if desired, separating a resulting mixture of isomers into the single isomers.

In the above starting material, a substituent X capable of being converted into the desired N-(tertiary amino-lower alkyl)-N-R-amino group, may be a departing group. A preferred substituent of that type is above all a mercapto group, a thiono group, or a substituted mercapto group. The preferred starting material is, therefore, a 2-aryl-4-mercapto-quinazoline compound or a tautomer thereof, or a salt of such compounds, particularly a compound having one of the tautomeric formulae

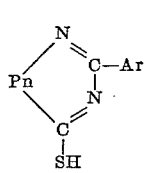 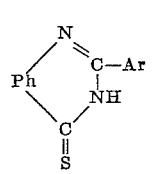 and 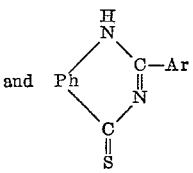

in which formulae Ph and Ar have the previously-given meaning, as well as a compound having the formula

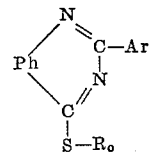

in which Ph and Ar have the previously-given meaning, and R$_o$ is an organic radical, such as an aliphatic group, for example, lower alkyl, e.g. methyl, ethyl, isopropyl and the like, or any other suitable organic group, such as phenyl-lower alkyl, e.g. benzyl and the like, or a salt of such compound.

The conversion of the above group X into the N-(tertiary amino-lower alkyl)-N-R-amino group is carried out by reacting the above 2-aryl-4-X-quinazoline starting material, in which X is a mercapto group, a thiono group, or a substituted mercapto group, with an N-(tertiary amino-lower alkyl)-N-R-amine, in which R has the previously-given meaning, and lower alkyl separates tertiary amino from amino in 4-position by 2 carbon atoms, or a salt thereof, particularly with a compound of the formula R—NH—(C$_n$H$_{2n}$)—Am, in which Am and the group of the formula —(C$_n$H$_{2n}$)— have the previously-given meaning, or a salt thereof. The reaction is performed according to known methods, preferably at an elevated temperature; if desired, an excess of the N-(tertiary amino-lower alkyl)-N-R-amine may be employed. The reaction may be carried out in the absence or in the presence of a diluent, e.g. ethanol and the like, or a mixture of solvents, if necessary, in a closed vessel and/or in the atmosphere of an inert gas.

The above starting material, in which X is a mercapto group, a substituted mercapto group, or a thiono group, i.e. the 2-acyl-4-mercapto-quinazoline compounds, particularly those having one of the above formulae, are new and are intended to be included within the scope of this invention. Apart from being useful as intermediates in the above procedure, it has also been found, that the above 2-aryl-4-mercapto-quinazoline compounds have antihypertensive properties and are useful as antihypertensive agents in the treatment of hypertensive conditions.

Particularly useful either as starting materials in the above procedure or as antihypertensive agents are the compounds having one of the tautomeric formulae

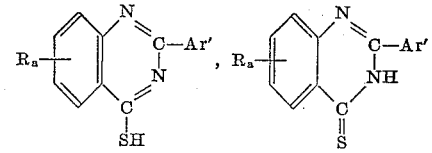

and

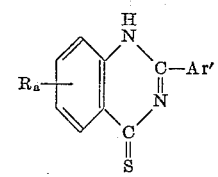

in which R$_a$ and Ar′ have the previously-given meaning.

I prefer to prepare the above 2-aryl-4-mercapto-quinazoline compounds by reacting an N-monocyclic carbocyclic aryl arylimidoyl halide, in which at least one of the ortho-positions of the monocyclic carbocyclic aryl portion is unsubstituted, particularly a compound of the formula:

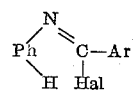

in which Ph and Ar have the previously-given meaning, and Hal is halogeno, with a metal thiocyanate at an elevated temperature, and, if desired, converting in a resulting 2-aryl-4-mercapto-quinazoline compound an unsubstituted mercapto group into a substituted mercapto group having the formula —S—R$_o$, in which R$_o$ has the previously-given meaning.

In the above starting material the halogeno atom Hal is particularly chloro, but may also be bromo and the like. A metal thiocyanate is, for example, an alkali metal thiocyanate or an alkline earth metal thiocyanate, but is more particularly a heavy metal thiocyanate, e.g. lead thiocyanate and the like. The reaction of the starting material with the thiocyanate compound is carried out at an elevated temperature, preferably in the presence of a solvent, e.g. toluene and the like, or solvent mixture, if necessary, in a closed vessel and/or in the atmosphere of an inert gas, e.g. nitrogen and the like. If desired, the preparation of the starting material may be performed in steps. Thus, the N-monocyclic carbocyclic aryl aryl-imidoyl isothiocyanate formed as an intermediate, in which at least one of the ortho-positions of the monocyclic carbocyclic aryl portion is unsubstituted, particularly the compound of the formula

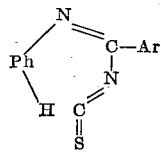

in which Ph and Ar have the previously-given meaning, may be isolated; upon heating, preferably in the presence of a suitable solvent e.g. toluene and the like, this intermediate is converted into the desired 2-aryl-4-mercapto-quinazoline compound.

The N-monocyclic carbocyclic aryl aryl-imidoyl halides used as the intermediates for the preparation of the 2-aryl-4-mercapto-quinazolines are manufactured, for example, by reacting an aryl carboxylic acid N-monocyclic carbocyclic aryl amide, in which at least one of the ortho-positions of the monocyclic carbocyclic aryl group is unsubstituted, especially a compound of the formula

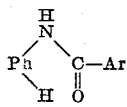

in which Ph and Ar have the previously-given meaning, with a suitable halogenating reagent capable of converting an amide grouping into an imidoyl halide group, for example, a phosphorous halide, e.g. phosphorous pentachloride, phosphorous tribomide and the like, a thionyl halide, e.g. thionyl chloride and the like, or any other equivalent halogenating reagent, preferably at an elevated temperature, and, if necessary, in the presence of a suitable diluent and/or in a closed vessel.

Another procedure for the preparation of the 2-aryl-4-mercapto-quinazoline compounds, which are useful either as starting materials or as antihypertensive agents, comprises converting in a 2-aryl-4-X$_o$-quinazoline, particularly in a compound of the formula

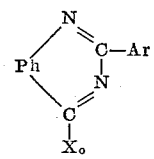

in which Ph and Ar have the previously-given meaning, and X$_o$ is a group capable of being converted into a mercapto group, or a tautomer thereof, the group X$_o$ into mercapto.

The above reaction is carried out according to known methods. For example, in a 2-aryl-4-hydroxy-quinazoline compound or its tautomer, the 2-aryl-4-oxo-quinazoline, hydroxyl is replaced by thiono by treatment with phosphorus pentasulfide in the presence of a high boiling inert solvent, e.g. xylene and the like, or, a 2-aryl-4-halogeno-quinazoline compound may be converted into the desired 2-aryl-4-mercapto-quinazoline by treatment with hydrogen sulfide or an alkali metal hydrosulfide, e.g. sodium hydrosulfide and the like, or into a 2-aryl-4-substituted mercapto-quinazoline compound by treatment with an organic mercaptane compound or an alkali metal salt thereof in the presence of a suitable diluent.

In a resulting 2-aryl-4-unsubstituted mercapto-quinazoline compound the mercapto group may be converted into a substituted mercapto group of the formula —S—R$_o$, in which R$_o$ has the previously-given meaning. The conversion may be carried out according to known methods, for example, by treating the 2-aryl-4-unsubstituted mercapto-quinazoline or a salt thereof with a suitable reactive ester of an alcohol, for example with a di-lower alkyl sulfate, e.g. dimethyl sulfate and the like, in the presence of a base, e.g. sodium hydroxide and the like.

Another group representing X in a 2-aryl-4-X-quinazoline starting material, in which X is capable of being replaced by N-(tertiary amino-lower alkyl)-N-R-amino, is a reactive esterified hydroxyl group, especially halogeno (representing hydroxyl esterified with a hydrohalic acid) having preferably an atomic weight greater than 19, e.g. chloro, bromo and the like, as well as any other hydroxyl group esterified with a strong inorganic or organic acid, such as a strong organic sulfonic acid, e.g. p-toluene sulfonic acid and the like. The conversion of a reactive esterified hydroxyl group, especially of halogeno, into the desired N-(tertiary amino-lower alkyl)-N-R-amino group is carried out according to the method described above, i.e. by treating the appropriate starting material with an N-(tertiary amino-lower alkyl)-N-R-amine, in which lower alkyl separates tertiary amino from amino in 4-position by 2 carbon atoms, or a salt thereof. Again, the reaction is preferably performed at an elevated temperature, if necessary, in a closed vessel and/or in the atmosphere of an inert gas, e.g. nitrogen.

The above 2-aryl-4-reactive esterified hydroxy-quinazoline starting materials are known or are prepared according to known methods. For example, the 2-aryl-4-halogeno-quinazoline starting materials are obtained from the corresponding 2-aryl-quinazolin-4-one compounds or tautomeric 2-aryl-4-hydroxy-quinazoline compounds, by treating the latter with a suitable halogenation reagent capable of replacing an oxo group or a hydroxyl group by halogeno, for example, with a phosphorus halide, e.g. phosphorus pentachloride, phosphorus tribromide and the like, a thionyl halide, e.g. thionyl chloride and the like, or any other equivalent reagent, preferably at an elevated temperature, and, if necessary, in the presence of a suitable diluent. Other 2-aryl-4-reactive esterified hydroxy-quinazoline starting materials are prepared according to known esterification procedures.

Another group X in a 2-aryl-4-X-quinazoline starting material, capable of being replaced by the desired N-(tertiary amino-lower alkyl)-N-R-amino group, in which R has the above-given meaning, is the cyano group represented by the formula

Conversion of such group into N-(tertiary amino-lower alkyl)-N-R-amino is carried out as described above, for example, by reacting a 2-aryl-4-cyano-quinazoline compound with the appropriate N-(tertiary amino-lower alkyl)-N-R-amine, in which R has the previously-given meaning, preferably in the presence of a diluent, such as a lower alkanol, e.g. methanol and the like, if necessary, at an elevated temperature, and/or in a closed vessel.

The starting materials used in the above modification of the procedure of this invention may be prepared according to known methods, for example, by reacting a 4-unsubstituted 2-aryl-quinazoline compound with a saturated solution of hydrogen cyanide in methanol in a sealed tube.

In a 2-aryl-4-X-quinazoline starting material, the group X capable of being replaced by an N-(tertiary amino-lower alkyl)-N-R-amino group may also represent a polyhalogeno-methyl group, particularly trichloromethyl, as well as dichloromethyl and the like. Its replacement by the desired N-(tertiary amino-lower alkyl)-N-R-amino group is carried out by treating the 2-aryl-4-polyhalogeno-methyl-quinazoline starting material with an N-(tertiary amino-lower alkyl)-N-R-amine, in which R has the previously-given meaning, and tertiary amino is separated from amino in 4-position by 2 carbon atoms; the reaction is carried out according to the previously-described procedure.

The above starting material is prepared according to known methods, for example, by reacting an N-monocyclic carbocyclic aryl aryl-imidoyl halide, especially chloride, with a polyhalogenated acetonitrile in the presence of a suitable Friedel-Crafts reagent, e.g. aluminum chloride and the like.

The group X in a 2-aryl-4-X-quinazoline starting material may also be a substituent which in the final product forms part of the desired N-(tertiary amino-lower alkyl)-N-R-amino group. Such group may be N-R-amino of the formula

in which R has the previously-given meaning. Conversion of such group into N-(tertiary amino-lower alkyl)-N-R-amino is carried out according to known methods; for example, a 4-amino-2-aryl-quinazoline starting material or a salt thereof may be treated with a reactive ester of a tertiary amino-lower alkanol, in which tertiary amino is separated from the hydroxyl group by said two carbon atoms, particularly with a compound of the formula $X'—(C_nH_{2n})—Am$, in which Am and the group of the formula $—(C_nH_{2n})—$, the latter separating Am from $X'$ by said two carbon atoms, have the previously-given meaning, and $X'$ is a reactive esterified hydroxyl group, or a salt thereof. The reactive esterified hydroxyl group $X'$ is particularly halogeno (i.e. hydroxyl esterified by a hydrohalic acid), having an atomic weight greater than 19, e.g. chloro, bromo and the like, as well as an organic sulfonyloxy group, e.g. 4-methyl-phenyl-sulfonyloxy and the like, or any equivalent reactive esterified hydroxyl group. The above reaction is carried out according to known methods; preferably, it is performed at an elevated temperature, and, if necessary, in the presence of a diluent and/or a base (which may also be furnished by an excess of the basic 4-amino-2-aryl-quinazoline starting material) to neutralize any generated acid, or to liberate the basic reagent from an acid addition salt, and/or in a closed vessel, and/or in the atmosphere of an inert gas, e.g. nitrogen.

The starting material used in the above modification of the process of this invention may be prepared according to known methods, for example, by converting in a 2-aryl-4-mercapto-quinazoline or a 2-aryl-4-halogeno-quinazoline, the group X into an N-R-amino group, for example, by treatment with ammonia or an ammonia-furnishing reagent, or with an N-substituted amine, such as an N-lower alkyl-amine.

Another group X in a 2-aryl-4-X-quinazoline starting material capable of being converted into the desired N-(tertiary amino-lower alkyl)-N-R-amino group, is an N-(reactive esterified hydroxy-lower alkyl) - N - R - amino group, in which lower alkyl separates reactive esterified hydroxyl from amino by said two carbon atoms, particularly a group of the formula

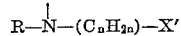

in which $X'$, R, and the group of the formula $$—(C_nH_{2n})—$$

separating $X'$ from the nitrogen atom by said two carbon atoms, have the previously-given meaning. Conversion of such group into the desired N-(tertiary amino-lower alkyl)-N-R-amino group is carried out according to known methods, for example, by reacting the starting material or a salt thereof with a secondary amine, particularly with a compound of the formula H—Am, in which Am has the previously-given meaning. The above reaction is carried out according to the one previously-described involving the reaction of a 2-aryl-4-amino-quinazoline compound with a reactive esterified ester of a tertiary amino-lower alkanol.

The 2-aryl-4-N-(reactive esterified hydroxy-lower alkyl)-N-R-amino-quinazoline starting material is prepared according to known methods. Thus, a 4-(N-R-amino)-2-aryl-quinazoline compound, in which R has the previously-given meaning, or a salt thereof may be treated with a reactive ester of a reactive esterified hydroxy-lower alkanol, in which the two reactive esterified hydroxyl groups are separated by at least two carbon atoms, preferably with a compound of the formula $X''—(C_nH_{2n})—X'$ in which $X'$ and the group of the formula $—(C_nH_{2n})—$ have the previously-given meaning, and $X''$ is a reactive esterified hydroxyl group, especially halogeno; such compound is represented by halogeno-lower alkyl halide, in which the two halogeno groups, having preferably an atomic weight greater than 19, are different and are separated by said two carbon atoms. A 4-(N-R-amino)-2-aryl-quinazoline compound may also be reacted with a reactive esterified hydroxy-lower alkanol, in which the reactive esterified hydroxyl group represents primarily halogeno and is separated from the hydroxyl group by said two carbon atoms, particularly with a compound of the formula, $X''—(C_nH_{2n})—OH$, in which $X''$ and the group of the formula $—(C_nH_{2n})—$ have the previously-given meaning, and in a resulting 2-aryl-4-N-(hydroxy-lower alkyl)-N-R-amino-quinazoline compound, in which R has the previously-given meaning, and hydroxyl is separated from the amino group by said two carbon atoms, the hydroxyl group is then converted into a reactive esterified hydroxyl group (for example, into halogeno by treatment with a suitable halogenating reagent, e.g. thionyl chloride, phosphorus tribromide and the like, or into an organic sulfonyloxy group by treatment with an organic sulfonic acid halide, e.g. p-toluene sulfonic acid chloride and the like).

The group X in the above 2-aryl-4-X-quinazoline starting material may also represent an N-(tertiary amino-lower alkanoyl)-N-R-amino group or an N-(tertiary amino-lower thioalkanoyl)-N-R-amino group, in which tertiary amino is separated from amino in 4-position by 2 carbon atoms, particularly the group of the formula

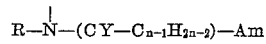

in which Am and R have the previously given meaning, Y stands for oxo of the formula $=O$ or thiono of the formula $=S$, and the portion of the formula $$—(CY—C_{n-1}H_{2n-2})—$$

separates tertiary amino from the amino group in 4-position by 2 carbon atoms. 2-aryl-4-N-(tertiary amino-lower alkanoyl)-N-R-amino-quinazoline and 2-aryl-4-N-(N,N-alkylene-imino-lower thioalkanoyl)-N-R-amino-quinazoline starting materials are converted into the desired compounds of this invention according to known methods capable of replacing oxo in a carbonyl group or thiono in a thiocarbonyl group by two hydrogen atoms.

Replacement of oxo by two hydrogen atoms is carried out by reduction and is preferably achieved by treating the appropriate starting material with an aluminum hydride, particularly an alkali metal aluminum hydride, e.g. lithium aluminum hydride, sodium aluminum hydride and the like, or an alkaline earth metal aluminum hydride, e.g. magnesium aluminum hydride and the like, or aluminum hydride. If necessary, activators, such as, for example, aluminum chloride, may be used together with the hydride reducing reagent. The reaction with these reducing reagents is preferably performed in the presence of an inert solvent, particularly an ether, such as a di-lower alkyl ether, e.g. diethyl ether, di-n-propyl ether and the like, a cyclic ether, e.g. tetrahydrofuran, p-dioxane and the like, or any other suitable solvent, and preferably at an elevated temperature. Conversion of the carbonyl portion of an amide grouping may also be achieved by treating the appropriate starting material with hydrogen in the presence of certain catalysts, such as a copper-chromium catalyst and the like, by electrolytic reduction or any other suitable method.

Replacement of sulfur in a thiocarbonyl group by two hydrogens may be carried out by desulfurization according to known methods, for example, by treatment with a freshly prepared hydrogenation catalyst, such as Raney nickel, in an alcoholic solvent, e.g. methanol, ethanol and the like, if desired, in the presence of hydrogen, by electrolytic reduction and the like.

The starting materials used in the above modification of the procedure of this invention are prepared, for example, by reacting a 4-(N-R-amino)-2-aryl-quinazoline compound, in which R has the above-given meaning, with a tertiary amino-lower alkanoic acid halide, e.g. chloride, bromide and the like, in which the tertiary amino group is separated from the halide portion by said two carbon atoms; this reaction may be carried out in the presence of a liquid organic base, e.g. pyridine and the like, which may also serve as the diluent, and/or of an inert solvent, e.g. benzene, toluene and the like, either by using an excess of the basic starting material or an additional base, e.g. potassium carbonate and the like, to neutralize any generated acid. Furthermore, a 4-(N-R-amino)-2-aryl-quinazoline compound may be reacted with a reactive esterified hydroxy-lower alkanoic acid halide, such as a halogeno-lower alkanoic acid halide, in which the reactive esterified hydroxyl groups, such as halogeno, is separated from the halide portion, such as the chloride portion, by said two carbon atoms, and a resulting 2-aryl-4-N-(reactive esterified hydroxy-lower alkanoyl)-N-R-amino-quinazoline compound is then reacted with a secondary amine to yield the desired starting material. In a resulting 2-aryl-4-N-(tertiary amino-lower alkanoyl)-N-R-amino-quinazoline starting material, in which tertiary amino is separated from amino by said two carbon atoms, the carbonyl portion of the amide grouping may be replaced by thiocarbonyl, for example, by treatment with a reagent capable of replacing oxo by thiono, e.g. phosphorus pentasulfide and the like, as previously-described.

The group X in a 2-aryl-4-X-quinazoline starting material may also represent an N-(x-oxo-x-tertiary amino-lower alkyl)-N-R-amino group or an N-(x-tertiary amino-x-thiono-lower alkyl)-N-R-amino group, in which tertiary amino is separated from amino in 4-position by 2 carbon atoms and substitutes the carbon atom carrying the oxo group and the thiono group, respectively, particularly the group of the formula

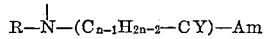

in which Am, R and Y have the previously-given meaning, and the portion of the formula $$—(C_{n-1}H_{2n-2}—CY)—$$

separates Am from amino in 4-position by 2 carbon atoms. In the 2-aryl-4-N-(x-tertiary amino-x-oxo-lower alkyl)-N-R-amino-quinazoline and 2-aryl-4-N-(x-tertiary amino-x-thiono-lower alkyl) - N - R - amino-quinazoline starting materials, the oxo group or the thiono group are replaced by two hydrogens according to known methods, such as those previously described.

The starting materials used in the above modification of the process for the manufacture of the compounds of this invention are prepared according to known methods. For example, a 4-(N-R-amino)-2-aryl-quinazoline compound, in which R has the above-given meaning, may be reacted with a reactive esterified hydroxy-lower alkanoic acid or a functional acid derivative thereof, particularly a compound of the formula $X'—C_{n-1}H_{2n-2}—COOH$, in which X' has the previously-given meaning (being particularly halogeno having an atomic weight greater than 19, e.g. chloro, bromo and the like), or a functional acid derivative thereof. A particularly suitable functional acid derivative of the above carboxylic acid is a reactive esterified hydroxy-lower alkanoic acid tertiary amide, particularly a compound of the formula $$X'—(C_{n-1}H_{2n-2}—CO)—Am$$

in which X' and Am have the previously-given meaning. Other functional acid derivatives of the above reactive esterified hydroxy-lower alkanoic acid are its esters, particularly its lower alkyl, e.g. methyl, ethyl and the like, esters, or any other functional acid derivative, for example, a reactive esterified hydroxy-lower alkano-nitrile and the like. The reaction of a 4-(N-R-amino)-2-aryl-quinazoline compound with the reactive esterified hydroxy-lower alkanoic acid or a functional acid derivative thereof is carried out in the presence of an appropriate diluent, for example, a liquid organic base, e.g. pyridine and the like, to neutralize any generated acid, and if necessary, at an elevated temperature.

In a resulting compound, the free carboxyl group or a functionally converted carboxyl group other than a tertiary amido grouping is then converted into the latter according to known methods. Thus, a resulting intermediate having a free carboxyl group is converted into its carboxylic acid halide, e.g. chloride and the like (for example, by treatment with a thionyl halide, e.g. thionyl chloride and the like), which is then reacted with a secondary amine, particularly a compound of the formula H—Am, in which Am has the previously-given meaning, to yield the desired starting material. An ester group, such as carbo-lower alkoxy, in a resulting compound, is converted into a tertiary amido grouping by treatment with a secondary amine, particularly a compound of the formula H—Am, in which Am has the previously-given meaning, whereas a cyano group in a resulting nitrile intermediate may first be hydrolyzed into the free carboxyl group or alcoholyzed into an esterified carboxyl group, and the resulting carboxylic acid compound or an ester thereof is converted into the desired 4-N-(x-oxo-x-tertiary amino - lower alkyl)-N-R-amino - quinazoline starting material according to any of the previously-described methods. In the latter, the oxo group may be replaced by thiono, for example, by treating it with a suitable reagent, e.g. phosphorus penta-sulfide and the like, as previously-described.

The compounds of this invention may also be prepared by introducing a double bond into the 3,4-position of a 2-aryl-4-N-(tertiary amino-lower alkyl)-N-R-amino-3,4-dihydroquinazoline compound, in which R has the previously-given meaning, and lower alkyl separates tertiary amino from amino in 4-position by 2 carbon atoms, and, if desired, carrying out the optional steps.

The above reaction is carried out according to known methods; it is preferably achieved by oxidation, for example, by air oxidation, or by treatment with any other suitable oxidation reagent, such as potassium ferric cyanide, iodine and the like, preferably in the presence of a diluent.

The starting material used in the above reaction is prepared according to known methods, for example, by treating a 2-aryl-quinazoline compound with an N-(tertiary amino-lower alkyl)-N-R-amine, in which R has the previously-given meaning, and lower alkyl separates tertiary amino from amino in 4-position by two carbon atoms, particularly with a compound of the formula R—NH—($C_nH_{2n}$)—Am, in which Am, R and the group of the formula —($C_nH_{2n}$)— have the previously-given meaning. If oxygen is present during the preparation of the above starting materials, the latter may be converted directly into the desired 2-aryl-4-N-(tertiary amino-lower alkyl)-N-R-amino-quinazoline compounds of this invention.

A resulting acid addition salt of a compound prepared according to the procedure of this invention may be converted into the free compound, for example, by reacting it with an alkaline reagent, such as a metal hydroxide, e.g. lithium hydroxide, sodium hydroxide, potassium hydroxide, calcium hydroxide and the like, a metal carbonate, e.g. sodium, potassium or calcium carbonate or hydrogen carbonate and the like, ammonia and the like, or any other suitable base, or by treatment with a suitable hydroxyl ion exchange resin.

A resulting acid addition salt of a compound prepared according to the procedure of this invention may also be converted into another acid addition salt; for example, the addition salt with an inorganic acid may be reacted with a suitable metal, e.g. sodium, silver, barium and the like, salt of an acid in the presence of a diluent, in which a resulting inorganic compound is insoluble and is thus removed from the reaction. Conversion of an acid addition salt into another acid addition salt may also be achieved by treatment with an anion exchange preparation.

A free compound resulting from the process of this invention may be converted into an acid addition salt thereof by reacting it or a solution thereof in a suitable solvent or solvent mixture with an acid or a solution thereof, or with an anion exchange preparation, and isolating the desired salt. A salt may be obtained in the form of a hydrate thereof or may include solvent of crystallization.

N-oxides of the compounds of this invention may be prepared, for example, by treating the free compound with a suitable N-oxidation reagent, such as hydrogen peroxide, ozone or a peracid, e.g. peracetic, perbenzoic, monoperphthalic, persulfuric acid and the like, in an inert solvent. An N-oxide may be converted into a salt thereof according to the above procedure.

The quaternary ammonium derivatives of the compounds of this invention may be obtained, for example, by reacting the base with a reactive ester of an alcohol and a strong acid, such as, for example, with one of the lower alkyl halides, di-lower alkyl-sulfates, lower alkyl sulfonates, phenyl-lower alkyl halides described above. The quaternizing reaction may be performed in the absence or presence of a solvent, while cooling or at an elevated temperature, if necessary, in a closed vessel, and/or in the atmosphere of an inert gas, e.g. nitrogen and the like.

Quaternary ammonium compounds may be converted into other quaternary ammonium compounds, such as quaternary ammonium hydroxides. The latter may be obtained, for example, by reacting a quaternary ammonium halide with silver oxide, or a quaternary ammonium salt with a hydroxyl ion exchange preparation, by electrodialysis or any other suitable method. A quaternary ammonium hydroxide may be converted into a quaternary ammonium salt by reacting the former with a suitable acid. A quaternary ammonium salt may be converted directly into another quaternary ammonium salt; for example, a quaternary ammonium iodide may be reacted with freshly prepared silver chloride or with hydrochloric acid in anhydrous methanol to yield the desired quaternary ammonium chloride, or a quaternary ammonium salt may be treated with an anion exchange preparation and thus be converted into another quaternary ammonium salt. A quaternary ammonium compound may be obtained in the form of a hydrate thereof or may contain solvent of crystallization.

A mixture of resulting isomeric compounds may be separated into the single isomers. For example, racemates may be resolved into the optically active d- and l-forms according to known resolution procedures, for example, by forming a salt of the free racemic compound with one of the optically active forms of an acid containing an asymmetric carbon atom. Especially useful as optically active forms of salt-forming acids having an asymmetric carbon atom are D-tartaric (l-tartaric) and L-tartaric (d-tartaric) acid, as well as the optically active forms of malic, mandelic, 10-camphor sulfonic, quinic acid and the like. From a resulting salt, the free and optically active compound may be obtained according to the method described above, and a free and optically active base may be converted into its acid addition salt, N-oxide, salt of an N-oxide or quaternary ammounium compound according to the procedures described above.

The invention also comprises any modification of the process, wherein a compound formed as an intermediate at any stage of the process, is used as starting material and the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

To a solution of 4.76 g. of 4-mercapto-2-phenyl-quinazoline in 60 ml. of 2-(4-morpholino)-ethylamine is added 60 ml. of absolute ethanol, and the mixture is refluxed for two hours. The volatile materials are removed by distillation under reduced pressure and diethyl ether is added to the oily residue to yield 5.2 g. of the crude 4-[2-(4-morpholino)-ethylamino]-2-phenyl-quinazoline of the formula

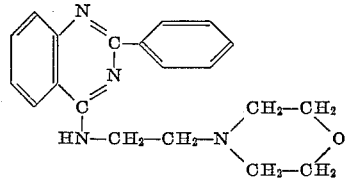

which melts at 139–140.5° after repeated crystallizations from a mixture of acetone and hexane. The 4-[2-(4-morpholino)-ethylamino]-2-phenyl-quinazoline dihydrochloride sesquihydrate, prepared by treating the free base with a concentrated solution of hydrogen chloride in isopropanol and diluting the solution with diethyl ether, melts at 285° (with decomposition). The corresponding picrate is obtained by reacting the 4-[2-(4-morpholino)-ethylamino]-2-phenyl-quinazoline with picric acid in the presence of ethanol.

The starting material used in the above procedure is prepared as follows: A mixture of 23.9 g. of N-phenyl benzoic acid amide and 22.0 g. of thionyl chloride is refluxed on the steam bath for six hours; the excess of thionyl chloride is evaporated under reduced pressure, the residue crystallizes upon cooling and is recrystallized from pentane to yield the N-phenyl benzimidoyl chloride of the formula

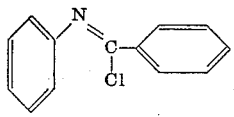

which melts at 40°; yield: 19.5 g., and is identical with the compound described by Von Braun et al., Ber., vol. 67, p. 1218 (1934).

A mixture of 47.5 g. of N-phenyl benzimidoyl chloride and 97.0 g. of lead thiocyanate in 500 ml. of benzene is refluxed for two hours. The solvents are evaporated to dryness under reduced pressure, the residue is taken up in 500 ml. of toluene and the mixture is refluxed for an additional 24 hours. After filtration the solution is kept in the refrigerator for 16 hours, and the 4-mercapto-2-phenyl-quinazoline having one of the tautomeric formulae

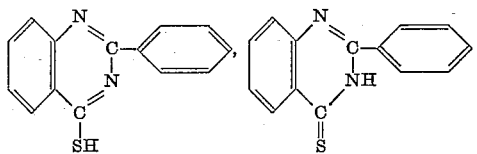

and

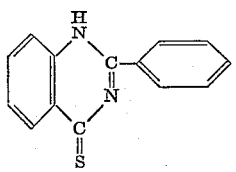

precipitates in the form of yellow crystals, which are filtered off and recrystallized several times from benzene, M.P. 226–228°.

The above 4-mercapto-2-phenyl-quinazoline may also be prepared as follows: A mixture of 4.4 g. of 2-phenyl-quinazolin-4-one and 4.4 g. of phosphorus pentasulfide in 50 ml. of xylene is refluxed for two hours while stirring. The reaction mixture is cooled, treated with 30 ml. of a 10 percent aqueous solution of sodium hydroxide and filtered. Water is added to the filtrate; the aqueous layer is separated, acidified with glacial acetic acid, and the yellow precipitate is filtered off, washed and dried to yield 2.85 g. of the desired 4-mercapto-2-phenyl-quinazoline, M.P. 225–229°.

Example 2

To a mixture of 1.19 g. of 4-mercapto-2-phenyl-quinazoline and 15 ml. of 2-N,N-diethylaminoethylamine is added 15 ml. of absolute ethanol; after refluxing for four hours, it is evaporated to dryness under reduced pressure to yield an oily residue which crystallizes on cooling. The solid material is washed with water and dissolved in diethyl ether; the organic solution is dried over anhydrous magnesium sulfate, filtered and treated with a concentrated solution of hydrogen chloride in isopropanol. The precipitate is collected by filtration to yield the 4-(2-N,N-diethylaminoethyl)-amino-2-phenyl-quinazoline dihydrochloride of the formula

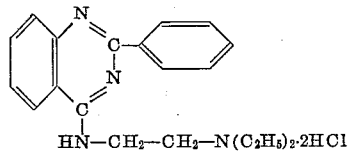

which melts at 269–271° after dissolving it in methanol, decolorizing the solution with a charcoal preparation, precipitating the salt with diethyl ether and repeating twice the recrystallization from a mixture of methanol and diethyl ether.

Example 3

To a mixture of 1.34 g. of 4-mercapto-6-methoxy-2-phenyl-quinazoline and 10 ml. of 2-(4-morpholino)-ethylamine is added 10 ml. of absolute ethanol. The resulting solution is refluxed for two hours, filtered and evaporated under reduced pressure; the residue is diluted with diethyl) ether, whereupon the 6-methoxy-4-[2-(4-morpholino)-ethylamino]-2-phenyl-quinazoline of the formula

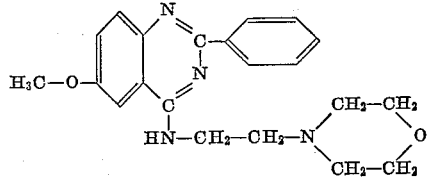

crystallizes; it melts at 182–184° after repeated recrystallizations from ethanol.

The starting material used in the above procedure is prepared as follows: A mixture of 81.0 g. of N-(4-methoxy-phenyl) benzoic acid amide and 50 ml. of thionyl chloride is refluxed on the steam bath for six hours; the excess of thionyl chloride is evaporated under reduced pressure and the residue is cooled. The desired N-(4-methoxy-phenyl) benzimidoyl chloride of the formula

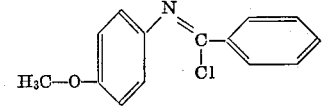

crystallizes and is recrystallized from cyclohexane, M.P. 57–60°. The product is identical with the compound described by Ugi et al., Ber., vol. 95, p. 126 (1962).

A mixture of 13.0 g. of N-(4-methoxy-phenyl) benzimidoyl chloride and 16.0 g. of lead thiocyanate in 200 ml. of benzene is refluxed for two hours and then evaporated to dryness under reduced pressure. The residue is taken up into 200 ml. of toluene, and refluxing is continued for 24 hours. The reaction mixture is filtered, the filtrate is allowed to stand overnight while cooling, and the crystalline 6-methoxy-4-mercapto-2-phenyl-quinazoline having one of the tautomeric formulae

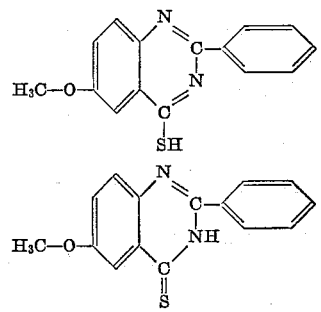

and

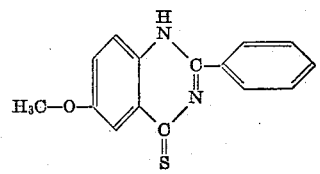

is filtered off and melts at 233–235° after one recrystallization from benzene, followed by two recrystallizations from a mixture of acetone and hexane.

Example 4

To a solution of 1.19 g. of 4-mercapto-2-phenyl-quinazoline in 15 ml. of 2-N,N-dimethylaminoethylamine is added 15 ml. of ethanol; the reaction mixture is refluxed for four hours and evaporated under reduced pressure. The residue is dissolved in diethyl ether, the organic solution is dried over anhydrous magnesium sulfate, filtered and treated with a concentrated solution of hydrogen chloride in isopropanol. The resulting precipitate is filtered off and dissolved in methanol; the solution is treated with a charcoal preparation, concentrated and diluted with diethyl ether. The desired 4-(2-N,N-dimethylaminoethyl)-amino-2-phenyl - quinazoline dihydrochloride of the formula

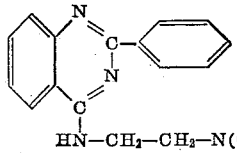

precipitates and is filtered off; it melts at 272–274° as the sesquihydrate after recrystallization from methanol and diethyl ether.

*Example 5*

To a solution of 2.38 g. of 4-mercapto-2-phenyl-quinazoline in 15 ml. of 2-(1-piperidino)-ethylamine is added 15 ml. of ethanol; the reaction mixture is refluxed for four hours and evaporated under reduced pressure. The residue is triturated with water and crystallizes, the crystalline material is filtered off and recrystallized from a mixture of diethyl ether and pentane to yield 2.05 g. of 4-[2-(1-piperidino)-ethylamino]-2-phenyl-quinazoline of the formula

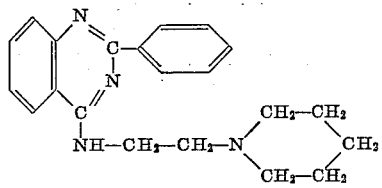

which melts at 120–122° after recrystallization from a mixture of diethyl ether and pentane.

Other compounds which are prepared according to the above described procedures, are, for example, 7-fluoro-4-N-[2-(4-morpholino)-ethyl] - amino-2-phenyl-quinazoline, M.P. 124–126°, prepared from 7-fluoro-4-mercapto-2-phenyl-quinazoline, M.P. 218–220°;

4-N-(2-N,N-di-n-propyl - amino-ethyl) - amino-2-phenyl-quinazoline, M.P. 118–119°;

4-N-[2-(4 - morpholino)-ethyl]-amino - 2 - (3,4,5-trimethoxy-phenyl) - quinazoline, M.P. 229–231°, prepared from 4-mercapto-2-(3,4,5-trimethoxy-phenyl)-quinazoline, M.P. 258–260°;

2-phenyl-4-N-[2-(1-piperazino) - ethyl] - amino-quinazoline, M.P. 235–137°;

6-benzyloxy-4-N-[2 - (4-morpholino) - ethyl]-amino-2-phenyl-quinazoline, M.P. 124–126°, prepared from 6-benzyloxy-4-mercapto-2-phenyl-quinazoline, M.P. 202–204°;

8-fluoro-4-N-[2-(4-morpholino)-ethyl] - amino-2-phenyl-quinazoline, M.P. 142–144°, prepared from 8-fluoro-4-mercapto-2-phenyl-quinazoline, M.P. 248–251° (with sublimation);

2-phenyl-4-N-[2-(1-pyrrolidino)-ethyl] - amino-quinazoline, M.P. 92–94°;

2-(2-chloro-phenyl)-7-fluoro-4 - N - [2-(4-morpholino)-ethyl]-amino-quinazoline, M.P. 131–133°, prepared from 2-(2-chloro-phenyl)-7-fluoro-4-mercapto-quinazoline, M.P. 184–185°;

4-N-[2-(4-morpholino) - ethyl] - amino-2-(2-thienyl)-quinazoline, M.P. 150–152°, prepared from 4-mercapto-2-(2-thienyl)-quinazoline, M.P. 228–230°;

as well as 2-(4-chloro-phenyl)-4-N-[2-(4-methyl-1-piperazino)-propyl] - amino - quinazoline, 7-methyl-2-phenyl-4-N-[2-(4-thiamorpholino)-ethyl] - amino-quinazoline, 6-fluoro-2-(4-methyl-phenyl) - 4-N-methyl-N-[2-(1-pyrrolidino)-ethyl]-amino - quinazoline, 6 - methyl-4-N-[2-(N-benzyl-N-methyl-amino) - propyl]-amino - 2-(3-pyridyl)-quinazoline, 4-N-[2-(N-cyclopentyl-N-methyl - amino)-ethyl]-amino-2-(2-naphthyl) - quinazoline and the like, which are prepared by reacting the proper 4-mercapto-quinazoline starting materials with the desired tertiary amino-lower alkyl-amine.

*Example 6*

A solution of 6-benzyloxy-4-N - [2-(4-morpholino)-ethyl]-amino-2-phenyl-quinazoline in 50 ml. of ethanol is treated with hydrogen under atmospheric pressure in the presence of 0.5 mg. of a palladium catalyst containing 10 percent of palladium on carbon. A total of 56 ml. of hydrogen is absorbed in 15 minutes; the hydrogenation is interrupted, the catalyst is filtered off and the filtrate is evaporated to dryness. The residue is taken up in diethyl ether, and the resulting 6-hydroxy-4-N-[2-(4-morpholino)-ethyl]-amino-2-phenyl - quinazoline of the formula

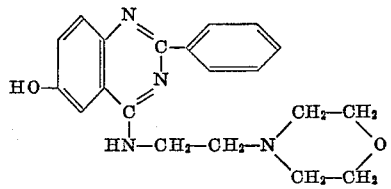

is recrystallized from a mixture of acetone and hexane and melts at 250–253° (with decomposition).

*Example 7*

A mixture of 0.7 g. of 4-mercapto-2-(4-pyridyl)-quinazoline and 10 ml. of 2-(4-morpholino)-ethylamine in 10 ml. of ethanol is refluxed for four hours. The volatile materials are evaporated under reduced pressure, and the residue is taken up into water. The crude 4-N-[2-(4-morpholino)-ethyl]-amino-2-(4-pyridyl) - quinazoline of the formula

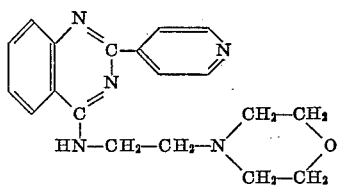

is recrystallized from a mixture of acetone and hexane, from cyclohexane, and then again from a mixture of acetone and hexane, M.P. 163–165°.

The starting material used in the above procedure is prepared as follows: A mixture of 10.7 g. of 4-pyridine carboxaldehyde and 13.6 g. of anthranilic acid amide in 100 ml. of ethanol is refluxed for fifteen minutes. The solvent is evaporated under reduced pressure, and the resulting 2-[(4-pyridyl)-methyl-imino]-benzoic acid amide is recrystallized from acetone, M.P. 178–181°.

To a solution of 12.0 g. of 2-[(4-pyridyl)-methyl-imino]-benzoic acid amide in 240 ml. of ethanol is added 24 ml. of a 2 N aqueous solution of sodium hydroxide. The reaction mixture is refluxed for sixteen hours, and is then concentrated under reduced pressure to a small volume. The residue is dissolved in a small amount of water, the solution is neutralized with dilute hydrochloric acid, and the white solid 2-(4-pyridyl)-3,4-dihydroquinazolin-4-one is recrystallized from ethanol; M.P. 280–282°.

A mixture of 0.5 g. of 2-(4-pyridyl)-3,4-dihydro-quinazolin-4-one and 0.5 g. of phosphorus pentasulfide in 100 ml. of xylene is refluxed for two hours. A total of 15 ml. of 2 N aqueous solution of sodium hydroxide is added, and the mixture is shaken in a separatory funnel. The organic layer is separated and washed with 2 N aqueous sodium hydroxide; the combined aqueous extracts are neutralized with glacial acetic acid. The 4-mercapto-2-(4-pyridyl)-quinazoline precipitates and is recrystallized from ethanol, M.P. 236–238°.

The 2 - (2 - chloro-phenyl)-4-N-[2-(4-morpholino)-ethyl]-amino-quinazoline, M.P. 114–116° is prepared according to a similar procedure; however the reaction of the 2 - [(2-chloro-phenyl)-methyl-imino]-benzoic acid amide with sodium hydroxide yields the 2-(2-chloro-phenyl)-3,4-dihydro-quinazolin-4-ol, which is oxidized into the 2-(2-chloro-phenyl)-3,4-dihydro quinazolin-4-one, M.P. 176–178°, by treatment with potassium permanganate and converted into the desired 2-(2-chloro-phenyl)-4-mercapto-quinazoline, M.P. 208–210°, by treatment with phosphorus pentasulfide in the presence of xylene.

*Example 8*

To a mixture of 1.1 g. of 4-N-[2-(4-morpholino)- ethyl]-amino-2-phenyl-quinazoline in 10 ml. of propionic acid anhydride are added four drops of pyridine and is then refluxed for two hours. The volatile materials are evaporated under reduced pressure and the residue is recrystallized from methanol and water to yield 4-N-[2-(4 - morpholino) - ethyl] - amino-N-propionyl-2-phenyl-quinazoline, which melts at 100–103°.

Upon treatment of a tetrahydrofuran solution of the above 4-N-[2-(4-morpholino)-ethyl]-N-propionyl-amino-2-phenyl-quinazoline with lithium aluminum hydride, the 4 - N - [2 - (4 - morpholino)-ethyl]-N-propyl-amino-2-phenyl-quinazoline is formed. The corresponding 4-N-ethyl - N - [2 - (4-morpholino)-ethyl]-amino-2-phenyl-quinazoline is obtained by treating the 4-N-[2-(4-morpholino)-ethyl]-amino-2-phenyl-quinazoline with acetic acid chloride or acetic acid anhydride, and reacting a tetrahydrofuran solution of the resulting 4-N-acetyl-N-[2-(4-morpholino) - ethyl] - amino-2-phenyl quinazoline with lithium aluminum hydride.

When reacted with hydrogen peroxide or methyl iodide, the 4 - N - ethyl - N-[2-(4-morpholino)-ethyl]-amino-2-phenyl-quinazoline is converted into its N-oxide or methiodide.

What is claimed is:

1. A member selected from the group consisting of a compound having the formula

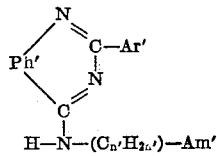

in which Ph′ is a member selected from the group consisting of 1,2-phenylene, (alkyl)-1,2-phenylene in which alkyl has 1 to 4 carbon atoms and (halogeno)-1,2-phenylene in which halogeno has an atomic weight from 19 to 80, Ar′ is a member selected from the group consisting of phenyl, (alkyl)-phenyl in which alkyl has 1 to 4 carbon atoms, (halogeno)-phenyl in which halogeno has an atomic weight from 19 to 80, pyridyl and thienyl, the group of the formula —$(C_{n'}H_{2n'})$— is alkylene having from two to three carbon atoms and separating the group Am′ from the nitrogen atom by two carbon atoms, and Am′ is a member selected from the group consisting of N,N-di-lower alkyl-amino, pyrrolidino, piperidino, 4-lower alkyl-piperazino, 4-morpholino, and 4-thiamorpholino, each of said lower alkyl substituents having 1 to 5 carbon atoms, and a pharmaceutically acceptable acid addition salt thereof.

2. A compound as claimed in claim 1 and being a member selected from the group consisting of 4-[2-(4-morpholino) - ethylamino] - 2-phenyl-quinazoline and a pharmaceutically acceptable acid addition salt thereof.

3. A compound as claimed in claim 1 and being the 4 - [2 - (4 - morpholino)-ethylamino]-2-phenyl-quinazoline and a pharmaceutically acceptable acid addition salt line dihydrochloride.

4. A compound as claimed in claim 1 and being a member selected from the group consisting of 4-(2-N,N-diethylamino-ethyl)-amino - 2 - phenyl-quinazoline and a pharmaceutically acceptable acid addition salt thereof.

5. A compound as claimed in claim 1 and being a member selected from the group consisting of 4-(2-N,N-dimethylaminoethyl) - amino - 2-phenyl-quinazoline and a pharmaceutically acceptable acid addition salt thereof.

6. A compound as claimed in claim 1 and being a member selected from the group consisting of 4-[2-(1-piperidino)-ethylamino]-2-phenyl-quinazoline and a pharmaceutically acceptable acid addition salt thereof.

7. A compound as claimed in claim 1 and being a member selected from the group consisting of 6-hydroxy-4 - N-[2-(4-morpholino)-ethyl]-amino-2-phenyl-quinazoline and a pharmaceutically acceptable acid addition salt thereof.

8. A compound as claimed in claim 1 and being a member selected from the group consisting of 4-N-[2-(4-morpholino)-ethyl]-amino-2-(4-pyridyl)-quinazoline and a pharmaceutically acceptable acid addition salt thereof.

9. A compound as claimed in claim 1 and being a member selected from the group consisting of 4-N-[2-(4-morpholino)-ethyl]-amino - N - propionyl-2-phenyl-quinazoline and a pharmaceutically acceptable acid addition salt thereof.

No references cited.

ALEX MAZEL, *Primary Examiner.*

J. TOVAR, *Assistant Examiner.*

UNITED STATES PATENT OFFICE
CERTIFICATE OF CORRECTION

Patent No. 3,340,260                  September 5, 1967

Herbert Morton Blatter

It is hereby certified that error appears in the above numbered patent requiring correction and that the said Letters Patent should read as corrected below.

Column 20, lines 12 to 14, strike out "quinazoline and a pharmaceutically acceptable acid addition salt line dihydrochloride" and insert instead -- quinazoline dihydrochloride --.

Signed and sealed this 21st day of January 1969.

(SEAL)
Attest:

Edward M. Fletcher, Jr.
Attesting Officer

EDWARD J. BRENNER
Commissioner of Patents